Nov. 18, 1930.                K. DAVIS                1,782,392
       PROCESS AND MECHANISM FOR SEPARATING INTERMIXED MATERIALS
                Original Filed March 4, 1922    6 Sheets-Sheet 6
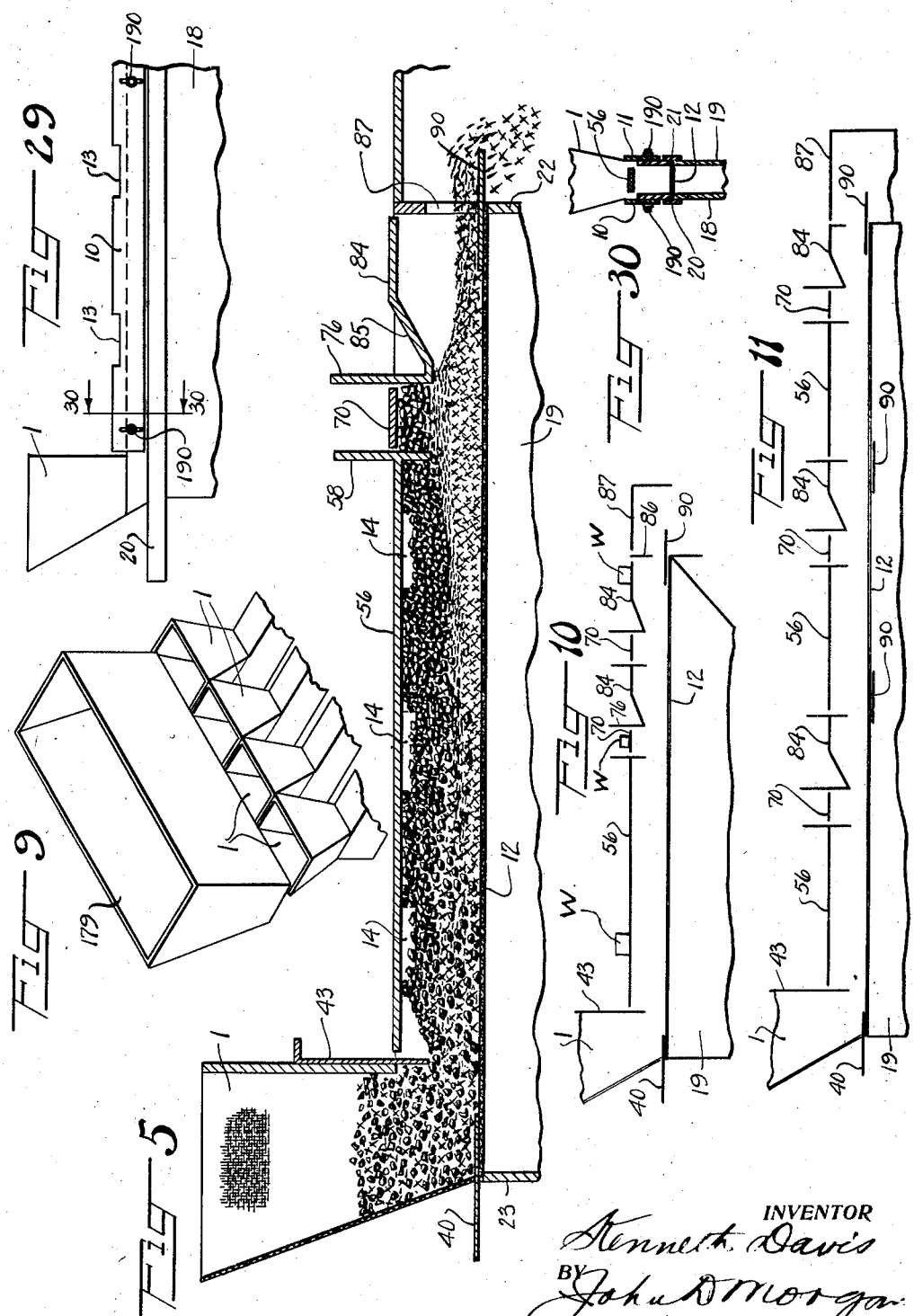
INVENTOR
Kenneth Davis
BY John D Morgan
ATTORNEY Patented Nov. 18, 1930

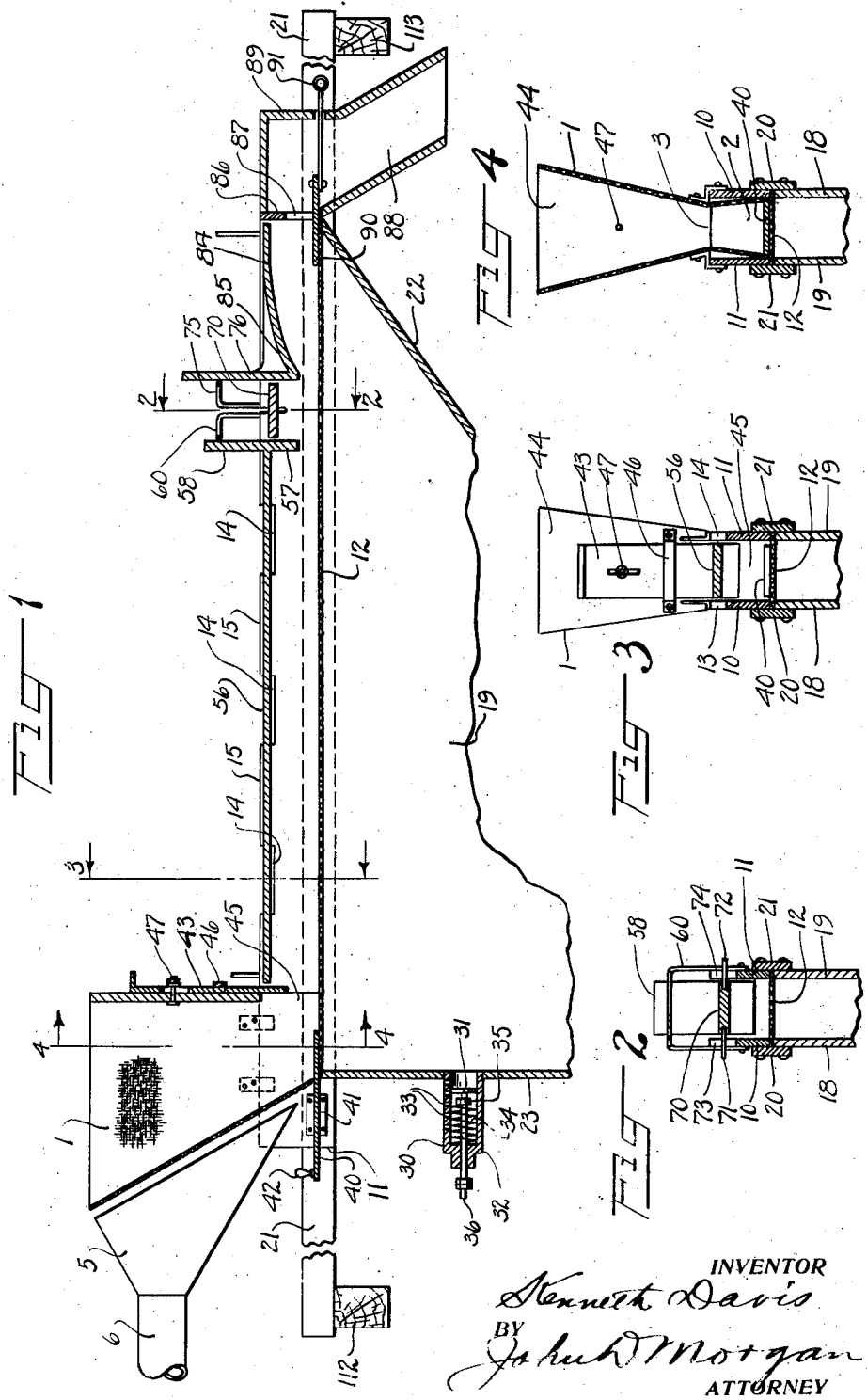

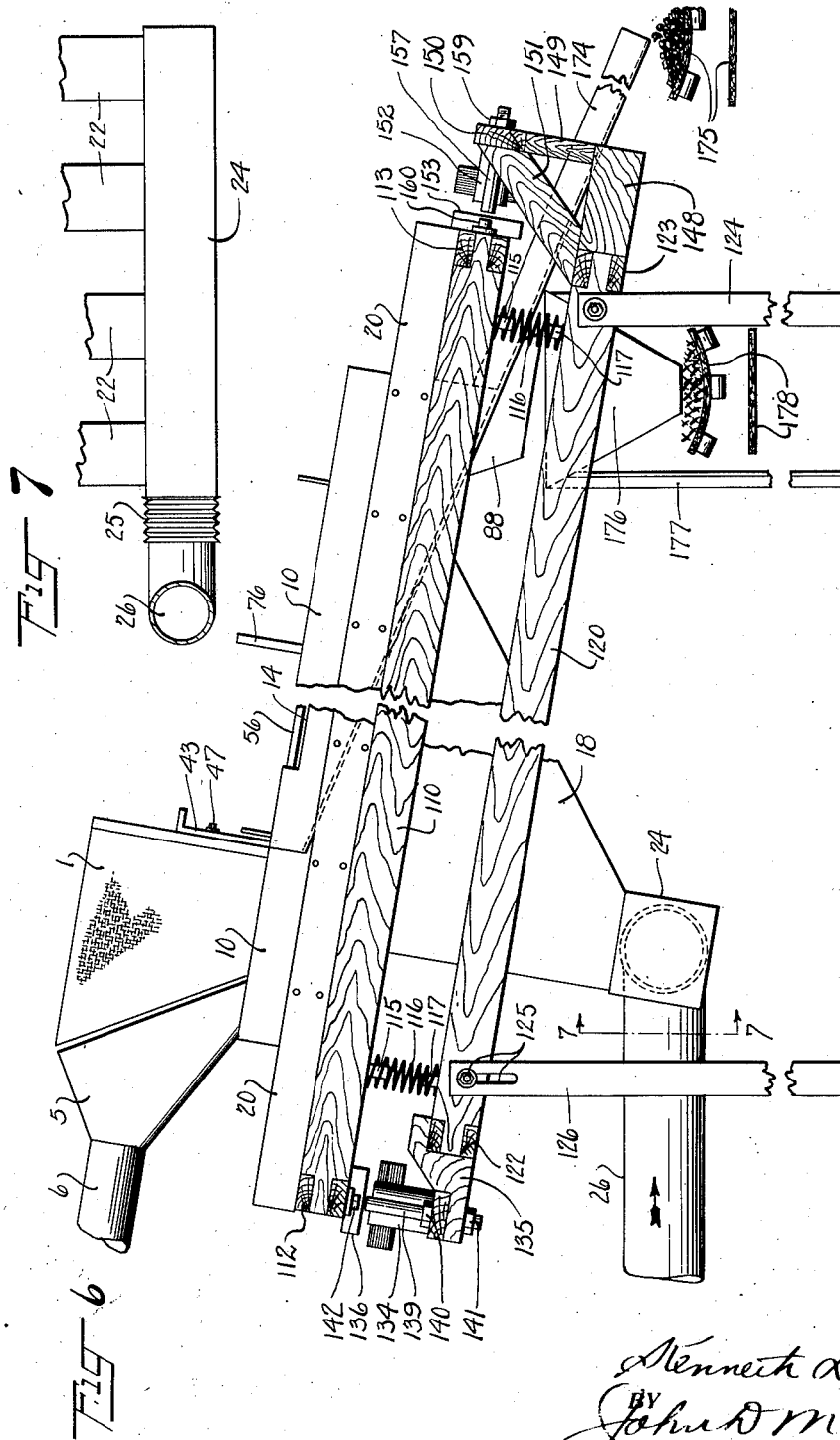

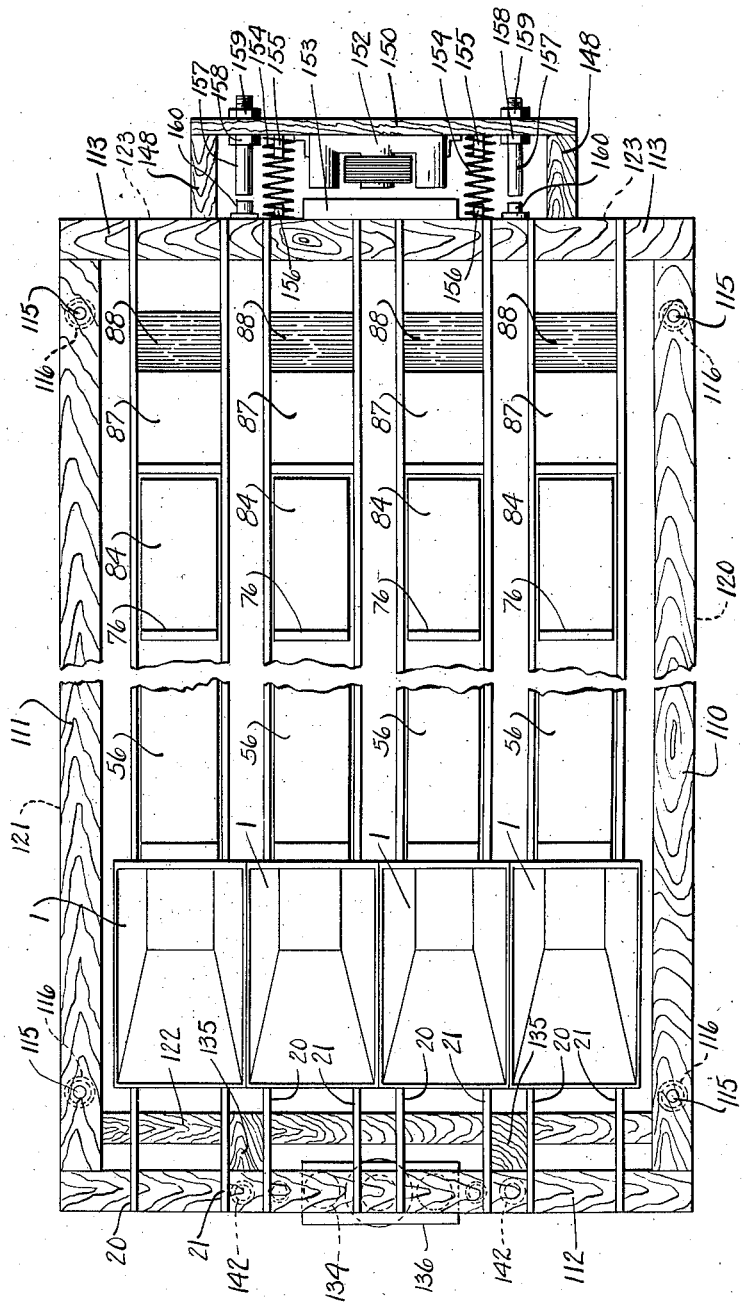

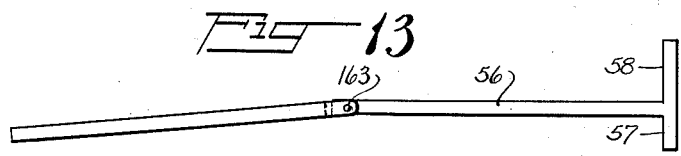
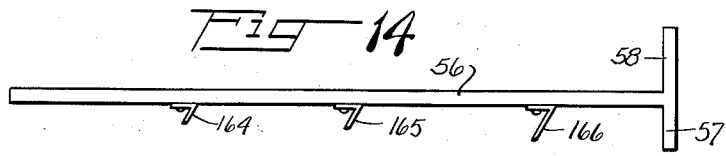
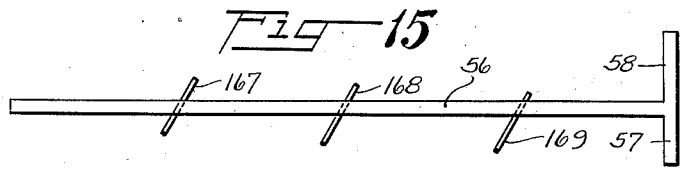
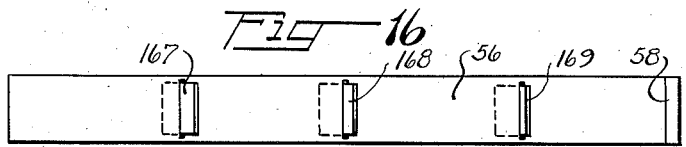
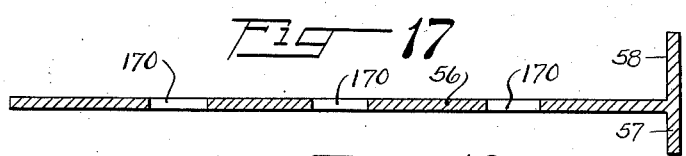
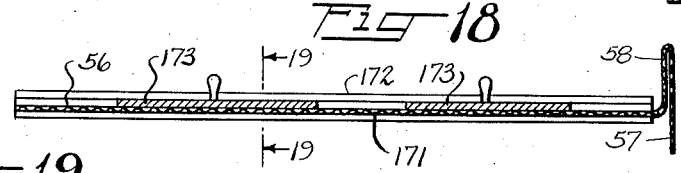
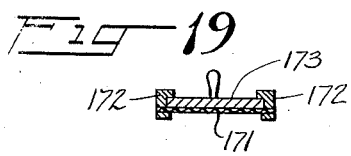

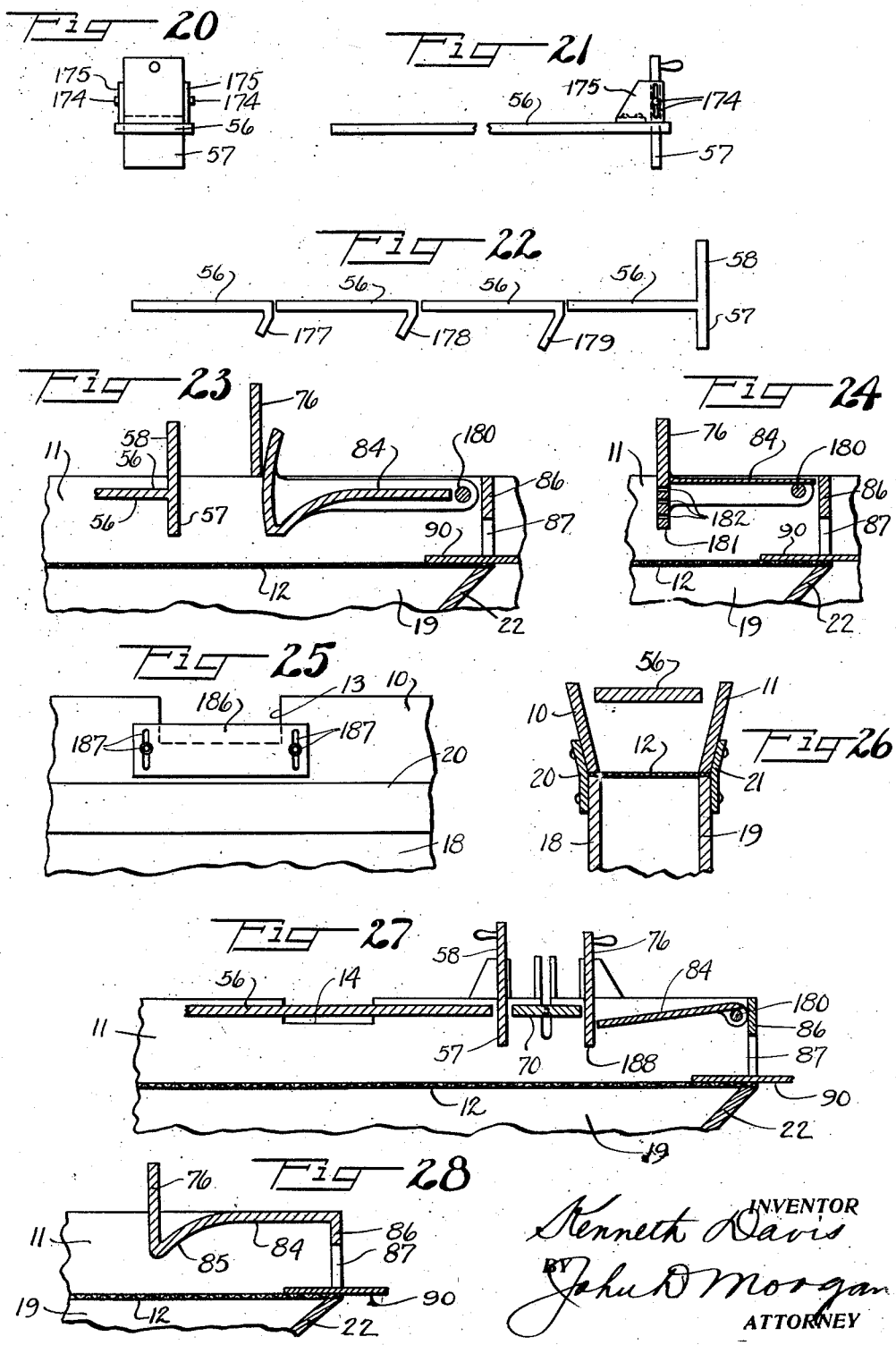

1,782,392

UNITED STATES PATENT OFFICE

KENNETH DAVIS, OF EBENSBURG, PENNSYLVANIA, ASSIGNOR, BY MESNE ASSIGNMENTS, TO PEALE-DAVIS COMPANY, OF WILMINGTON, DELAWARE, A CORPORATION OF DELAWARE

PROCESS AND MECHANISM FOR SEPARATING INTERMIXED MATERIALS

Application filed March 4, 1922, Serial No. 541,123. Renewed December 17, 1928.

The invention relates to a novel mechanism and process of separating intermixed, divided materials of different specific gravity, and more especially to such a novel mechanism and process wherein air under pressure and vibratory action are employed, the novel features of the invention being pointed out hereinafter.

The accompanying drawings, referred to herein and constituting a part hereof, illustrate one embodiment of the invention, and together with the description, serve to explain the principles of the invention.

Of the drawings:

Fig. 1 is a central longitudinal section of a mechanism that is, a separating unit, embodying the invention;

Fig. 2 is a transverse vertical section, taken substantially on the line 2—2 of Fig. 1;

Fig. 3 is a like section, taken substantially on the line 3—3 of Fig. 1;

Fig. 4 is a like section, taken substantially on the line 4—4 of Fig. 1;

Fig. 5 is a similar section to Fig. 1, but taken near one side and shows as well as may be, in a more or less diagrammatic and approximate manner, the cleaning or separating action;

Fig. 6 is a side elevation of the entire machine of which the separating unit is a part, and is taken looking at Figs. 1 and 5, from the front;

Fig. 7 is a fragmentary partial section and partial elevation, taken substantially on the line 7—7 of Fig. 6;

Fig. 8 is a top plan, corresponding to Fig. 6, showing a battery of four cleaning or separating units, with the discharge chutes and conveyors and the dust collectors omitted;

Fig. 9 is an isometric perspective of the feed hoppers shown at the left in Figs. 1, 5, 6 and 8;

Figs. 10 and 11 are diagrammatic representations of modified forms of the mechanism shown in Figs. 1 and 5;

Figs. 12 to 22 show various modified forms of one of the separating devices or members of the separating unit shown in Figs. 1 and 5;

Figs. 23 and 24 show modified forms of other of the separating devices or members of the separating unit shown in Figs. 1 and 5;

Fig. 25 shows an adjustment for the discharging opening in the separator unit for the lighter separated material;

Fig. 26 is a transverse vertical section, showing the separating unit with the sides thereof upwardly and outwardly inclined;

Figs. 27 and 28 are fragmentary vertical longitudinal sections showing modified forms of certain of the separating devices or members which are shown in Figs. 1 and 5;

Fig. 29 is a fragmentary side elevation of a separating unit showing the entire side of the unit vertically adjustable; and Fig. 30 is a transverse vertical section, taken substantially on the line 30—30 of Fig. 29.

In the present embodied form and according to the principles of the invention, an inclined bed of the intermixed divided materials, preferably relatively long and narrow in form and of considerable depth, is subjected to the separating action of a flow of air under pressure.

This separating action is preferably aided and expedited by a very rapid and short but forceful vibration of the bed of materials, unidirectional or preferably bi-directional, that is, both transversely and along the bed of material.

The intermixed materials are thereby rapidly separated and thus are gradually but very rapidly stratified, the heavy material sinking and then flowing longitudinally forwardly along the bottom of the bed, and is discharged from the lower end thereof. The lighter material at the same time seeks and flows along the upper part of the bed, and the air current in the upper part of the bed is directed not only upwardly but longitudinally and outwardly to discharge the lighter separated material transversely from the sides of the top of the bed.

It will be understood that the foregoing broad and general description and the following detailed description, as well, are exemplary and explanatory but are not restrictive of the invention, and that the statement of the principle of operation of the invention is correct and adequate as at present advised from observation of the invention in practical operation, but that the invention is not necessarily limited thereto or thereby.

Other features and principles of the invention will be first set forth in connection with the following detailed description of the present preferred embodiment as illustrated in the drawings.

The term "divided" is conveniently employed to describe material which is in relatively small pieces or parts as distinguished from material in relatively large masses, and may refer to material which has been broken into relatively small fragments, is naturally in small pieces, or is granular or pulverulent in character. An instance of such material is a mixture of coal, rock, and "bone" or "bony" a material which is somewhat similar to coal and is intermixed therewith in the vein, but which has a very high ash content.

Means are provided by the invention for supplying the intermixed divided material to the cleaning or separating mechanism, supplying the same thereto automatically at a rate just sufficient for the capacity of the cleaning unit, that is, at the highest rate of total and effective separation accomplished by the unit under the particular conditions of operation, such as the physical condition of the intermixed materials, the nature thereof, the size, or variations in size, thereof, the relative specific gravities of the intermixed materials, or other conditions.

As embodied, an approximately vertically disposed hopper 1 has all or three of its sides upwardly and outwardly inclined (as shown in Figs. 1, 5, 6, 8, and 9), the sides consisting preferably of foraminate or cribriform material such as wire mesh of rather a close weave, the size of the mesh depending partly on the size and nature of the materials. At its lower end Figs. 4, 8 and 9, the hopper 1 has its walls outwardly and downwardly inclined, as shown at 2 in Fig. 4, thereby forming a part 3 of least cross-sectional area, the passageway again increasing in size from this place downwardly and forwardly with the separating unit. This constitutes a throat at this intermediate point whereby choking and wedging of the material in the bottom of the hopper at the entrance into the separating unit is avoided, as there is an immediate expansion of the material after it passes the point 3, as it passes downwardly and onwardly.

In the present preferred form of the invention, dust-collecting means are provided in conjunction with the hopper 1 for cleaning the dust from the intermixed materials and conveying it away. In the embodied form, means are provided for permitting a portion of the air under pressure to come upwardly through the material in the hopper 1, and it blows the dust out through the foraminate walls of the hopper. The means for regulating the action of this air current are described later. Means are provided for collecting the blown-out dust, and as shown, a hood 5 is provided adjacent the hopper 1 or a battery of the hoppers, the hood 5 communicating with a pipe or conduit 6, through which the dust is carried away by air suction.

The embodied form of separating unit comprises a relatively long and narrow trough, which is now preferably constructed of rectangular cross section, and by reason of the shape and inclination thereof the separating elements cooperating therewith, and the action and direction of the air pressure, and the vibratory movement, a lighter intermixed material is discharged upwardly and over the edges of the unit while a heavier intermixed material is discharged at or near the end thereof.

The mechanism is constructed and arranged, in accordance with certain features of the invention, so that the air under pressure acts upon the materials being separated successively in different ways or forms, and so that the intermixed materials are subjected successively to essentially different separating action, each being especially efficient at that particular stage of the action to effect total and at the same time rapid separation of the materials.

Referring in detail to the present preferred embodiment of the separating unit into which the hopper supplies the intermixed materials as rapidly as they can be handled by the unit, this unit comprises vertically disposed, longitudinally extending and substantially parallel sides 10 and 11, and a bottom 12 consisting of fluid-pervious, and preferably foraminate or cribriform material such as a wire mesh (Figs. 1, 2, 3, 5 and 26).

The sides 10 and 11 are preferably provided with discharge openings 13 and 14, arranged or spaced apart at suitable intervals therealong, whereby the lighter intermixed material may be discharged at any point along the unit as soon as it is clear from the heavier material or materials. This provides also for the guidance and maintenance of one of the loose or floating separating elements by the intervening upwardly projecting portions 15 of the unit side walls. Other guiding means may be provided, and the recesses 13 and 14 in such case, may be retained or dispensed with, as may be desired.

Means are provided for supplying air or other fluid under pressure to the fluid pervious bottom 12 of the cleaning or separating unit, and as embodied, beneath the bottom 12 is a chamber having downwardly extending side walls 18 and 19, in alinement with the walls 10 and 11 of the unit, the edges of the bottom 12 being held between the side walls of the cleaning unit and those of the air pressure chambers, the walls being held together by nailed or bolted strips 20 and 21. These strips also extend beyond the end of the unit and serve as supporting means for the entire cleaning unit structure upon the machine frame, as will be later described.

The end wall 22 of the air chamber is shown in Figs. 1 and 6 as sharply inclined inwardly and downwardly this serving to make room for the chutes and conveyers for receiving the cleaned or separated materials. The other wall 23 of the air chamber is shown extending straight downwardly to a suitable source of air pressure supply.

The cleaning units are usually mounted and operated in a battery, and accordingly the air chambers are shown, in Figs. 6 and 7, as four in number, and as communicating with a header 24, having a flexible connection 25, with a pipe 26, coming from a bellows, blower, or other source of air pressure supply.

Means are provided in accordance with one feature of the invention for maintaining the air pressure in the air chamber constant at some desired predetermined pressure. As embodied, a valve mechanism 30 is provided, comprising a piston 31, working in a cylinder 32, the cylinder having a series of openings 33, in the side wall thereof. A spring 34 acts on the piston 31 and nut 35, screw threaded on the piston rod 36, serves to regulate the pressure at the predetermined point. When this pressure is exceeded, the spring 32 will yield, permitting escape or further escape of the air through the opening 33 in a well known manner.

In the embodied form of means for regulating the current of air which passes upwardly through the material in the hopper 1 to clean the duct, a slide 40 is mounted in guides 41, mounted upon the supporting rails 20 and 21, the slide passing into the bottom of the hopper 1, over the foraminate bottom 12, and by reason of its sliding movement is positionable for regulating the amount of air passing upwardly through the hopper.

Means are likewise provided for regulating the size of the opening between the hopper and the separating unit, for the purpose of regulating the feed of the material so that it will be (under the conditions then existent) just equal or sufficient for the full supply of the unit at the highest speed of complete and efficient separation of the materials.

As embodied, a slide 43 is mounted upon the face 44 of the hopper 1, which in this instance is shown of solid material, the slide being movable upwardly and downwardly into and out of the passageway 45, between the hopper and the separating unit. A guiding strip 46 keeps the slide 43 in position and a bolt and slot adjustment 47 will hold it at the desired point so that the passageway 45 will be of the size or area desired. The relation of the slide 40 and of the slide 43 may also be arranged so that they will cooperate in the control of the supply of intermixed material.

Means are provided for causing the air current in the upper part of the unit, that is in the stratum of the now separated lighter and superior material to flow and to act on the material so as to effect its discharge from the top and sides of the unit.

This means comprises a floating resistance or back pressure to the air current or initial separating pressure, which changes its direction and at a given or particular pressure, due to its floating or movable function will yield or give, and the air will then drive out sidewise carrying the separated lighter material with it from the unit.

As embodied, a plate 56 extends along the cleaning unit from at or near the hopper 1, preferably for a relatively large extent of the length of the unit, the plate being of a width to fill or approximately fill the top of the unit while being freely movable therein. This plate is shown solid in Figs. 1 and 5, and as being merely loose or floating on the air pressure, but certain modifications in the form thereof are shown in some of the later figures. This plate, in combination with the bed 12, defines a space in which the bed of materials is vertically confined.

Mechanical means are also provided for assisting the floating plate in effecting the discharge of the separated lighter material. In the embodied form of this means, a transversely arranged and downwardly extending baffle plate 57, is shown at the forward end of, and preferably fixed to the plate 56, which operates to arrest the forward movement of the completely separated superior stratum consisting of the lighter material, which is being discharged.

The plate 56 is also provided with an upwardly extending part 58, which is utilized to prevent longitudinal displacement of the plate 56, and part 58 is shown in contact with a transversely disposed guiding member 60, mounted on the unit, whereby the plate 56 may have free vertical movement under the action of the air pressure but is kept from longitudinal movement.

In accordance with one feature of the invention, and as at present embodied, an auxiliary separating and fluid pressure regulating and directing mechanism or device is provided. In the preferred embodiment thereof, a relatively short or small plate 70, shown in Figs. 1, 5 and 27, as loose or floating on the air pressure, is located just in front or forwardly of the baffle plate 57, and is preferably provided with locating and guiding devices which maintain it longitudinally in position while permitting its free upward and downward movement under the action of the air pressure. As so embodied, (Fig. 2), pins 71 and 72, project horizontally from the sides of plate 70 through slots 73 and 74, formed in the sides of the separating unit, and above the unit these pins slide in a guideway formed between the bent rod 60 and a like bent rod 75. The bent rod 75 is horizontally bent over and transversely disposed as is the rod 60, already described, and serves as a guide or locating member for another of the separating members to be later described.

Just in front of the vertically movable or floating plate 70 is a transversely disposed vertically projecting plate 76 which cooperates with the plate 70 and also constitutes a part of another separating member which will be later described.

In operation when the mechanism is properly adjusted it will be found that the last remnant or remainder of the lighter material will be completely segregated and discharged over the sides of the unit from beneath the plate 70.

Means are provided by the invention for effecting a final back pressure or change in the direction and consequent action of the air current to effect a final and complete separation of the remnants of the lighter material, and to effect the discharge thereof at the place or station 70, while permitting all of the heavier material or materials to pass on to a place of discharge at the bottom and forward end of the unit. As preferably embodied, Figs. 1 and 5, a plate 84 preferably free and floating upon the air pressure, is provided at the front or discharge end of the unit. The plate extends entirely across the unit, with only clearance for free movement, and it has a rearwardly and downwardly projecting part 85, which is preferably integral with the vertically disposed upwardly projecting plate 76, already referred to.

The forward end of the unit (Fig. 1) operates to create a back and upward pressure or reverse current of the air to assist in the final separating action just described. Accordingly, the front end of the unit is closed by a wall or partition 86 except that the lower part 87 is open to provide a discharge opening for the heavier of the intermixed but now separated materials. The opening 87 discharges into a downwardly and forwardly inclined chute 88, through which the separated heavy material is discharged. The upper part of the chute is enclosed or hooded over, as shown at 89 in Fig. 1.

This to a large extent deflects the air current backwardly and at the same time first downwardly and then upwardly and out through the discharge station or port 70. The air current is also stronger and has greater velocity at this part as the layer of rock is of less thickness due to the discharging action, the rock through the inclination and vibration of the unit accelerating and running rapidly down the chute. This increased volume and velocity of the air also increases the backward and upward separating action already described.

Means are provided for regulating the action of the air blast at this end of the unit, and accordingly a slide 90 is laid over the perforated floor 12 at this end and is slidable to and fro by means of a handle 91, extending outwardly through the upper part of the chute 88. This will regulate as desired the back pressure and travel of the air toward the exit at the station or discharging point 70.

In accordance with certain features of the invention, means are provided for imparting sharp, very short and rapidly recurrent vibrations to the separating unit. As previously stated, the units are preferably mounted in batteries, and in Figs. 6, 7, and 8 a battery of four separating units such as have been described are mounted in a single frame, the vibrating mechanism acting upon the frame and the battery of four separating units together.

Referring now to said embodied form, the frame for the battery of units comprises side reaches 110 and 111, with end reaches 112 and 113, of a rectangular frame. This frame is resiliently and vibratably mounted on a stationary frame, which latter is adjustably inclinable longitudinally of the cleaning or separating units, to vary their degree of downward and forward inclination as desired.

As embodied, the frame reaches 110 and 111 are provided adjacent to the corners with downwardly projecting pins 115, about which pins are coiled helical compression springs 116, which are also coiled about upwardly projecting pins 117 fixed in the lower stationary frame.

The lower frame comprises side reaches 120 and 121 and end reaches 122 and 123. Near the end reach 123, the side reaches 120 and 121 are pivotally connected each to the upper end of a pair of supporting legs 124. At or near the cross reach 122, the side reaches have a bolt and slot connection 125 with a pair of supporting legs 126, thus providing for the adjustment of the longitudinal inclination of the units.

Referring now to the vibrating means, and primarily to the transversely operating vibrating means, a magnet 134 is mounted upon an extension frame 135, projecting outwardly from the stationary frame. The armature 136 therefor is fastened to the under side of the vibratable frame. Means are provided for adjustably limiting the amplitude of the vibratory movement, and for this purpose, pins 139 are fixed in the frame 135, and are longitudinally adjustable by means of nuts 140 and 141 toward and away from the vibratable frame. Pins 142 are fixed in the vibratable frame in alignment therewith, to form a striking face therefor. Thus the amplitude of vibration may be adjusted and determined as desired.

Referring now to the longitudinally operating vibrating means, an extension frame 148 is fixed or attached to the front end of the stationary frame, and is provided with upwardly extending posts 149 and a top cross piece 150 and with side braces 151. Mounted on this frame is a magnet 152, the armature 153 thereof being fixed to the reach 123 of the vibratable frame.

Means for resiliently cooperating with the vibratory movement are provided, comprising helical springs 154, in compression between the frame piece 150 and the reach 123 of the vibratable frame. These springs are coiled, respectively, about pins 155, in the frame piece 150, and threaded pins 156 in alignment therewith and fixed in the reach 123 of the vibratable frame. The spring 116 will have sufficient resilient lateral play to permit of the short longitudinal vibrations.

Means for regulating and limiting the amplitude of the vibratory movement are provided similar to that already described. Pins 157 are carried in the stationary frame piece 150, and are longitudinally adjustable and positionable by means of nuts 158 and 159, screw threaded thereon on either side of the frame piece. In alignment therewith are pins 160 fixed to the cross reach 123 of the vibratable frames, to constitute striking faces therefor.

Suitable receiving and conveying means are provided for the separated materials, and in Fig. 6 forwardly and downwardly inclined chutes 174 are provided between and alongside of the separating units to receive and convey away all of the lighter material which is discharged over the sides of the units. These chutes are shown in Figs. 6 but are omitted in Fig. 8 for the sake of clearness. The chutes 174 discharge on a concave conveyor belt 175 which conveys away the separated and clean material.

The vibrating chutes 88 for the heavier separated material discharge into a chute or chutes 176, carried on the stationary frame and upon supports 177, these latter chutes discharging into a concave conveyor belt 178 which carries away the separated heavier material.

In Fig. 9 a common general supply hopper 179 is shown for the hoppers 1 of the four units in a single battery. The hopper 179 will be stationary, and will be arranged as closely as need be above the tops of the vibrating hoppers 1, but considerable space is shown therebetween in Fig. 9 for the sake of clearness of showing.

The manner of operation of the mechanism just described is substantially as follows:

The intermixed materials feed down gradually from the entirely full, or more or less completely full, hopper 1, and pass forwardly through the opening 45 at just the rate requisite for complete separation by the separating and cleaning unit. The air pressure through the mass of material is so regulated as to rapidly drive the lighter material to the top while the heavier of the intermixed materials sinks to the bottom, while at the same time the longitudinal and the transverse very short but rapid vibratory action facilitates and accelerates the separation. The longitudinal vibratory action also facilitates the advance of the material forwardly and downwardly through the unit.

The floating plate 56, floating upon the air current or body, creates a back pressure, and when this pressure is exercised permits a portion thereof to escape at either side and therewith an outflow of the lighter separated material. It causes the air also to travel in a current longitudinally and forwardly of the plate and regulates the air pressure to just the right degree to effect the gradual discharge of the lighter material over the edges of the unit, and prevents violent and uncontrolled action of the air through the mass of material.

Cooperating with the floating pressure controlling plate 56 is the baffle plate 57, which checks the forward travel of the lighter material, and also checks the forward travel of the upper part of the air current thereby backing up both the material and the air current and causing the air current to effect and facilitate the spillage of the separated lighter material over the sides of the unit.

The major part of the separation is very quickly effected, so that at an early stage of the progress along the separating unit, the bulk of the heavier material is resting upon the fluid pressure pervious floor 12 of the unit, and through the coaction of the vibratory movement and of the downward inclination of the unit, it passes on rapidly to the forward end of the unit and is discharged therefrom.

The lighter of the materials is not subjected, or only in a very small degree to this forwarding action just described in connection with the heavy material, but it is more entirely under the control of the air pressure, and is thereby not subjected to this expediting action, but moves upwardly and sideways and is discharged over the sides of the unit, as already described.

Due partly to the floating action of the plate 56, and partly to some degree of contact or friction between the now practically completely separated materials, some of the lighter material will or may pass the baffle plate 57 on the surface of the dense and separated and forwardly moving layer of heavier material. This residue of the lighter material is now met by the upwardly and backwardly directed counter curent of air pressure coming from the substantially closed front end of the device, is thereby directed upwardly in the passageway between the plates 58 and 75, and the plate 70 rising under the increased air pressure, the air blast spills this final residue of the lighter separated material over the sides of the unit at this point. The member 84, being also floated or otherwise movable, facilitates this action.

While the pressure plate 56 is free to "float" or move up and down in response to the air pressure, and is preferably so used, it should be understood that this plate in a broad sense, is an air deflecting member for directing the air coming up through the bed of materials, in a transverse direction, and as such, need not float, but could be fixed. But whether fixed or movable, it is important that the bed of materials be vertically confined between an air pervious bottom and an air deflecting top or cover. The function of this air deflecting cover is to create a lateral flow of air at or near the top of the bed of materials, which serves to discharge or skim off the lighter material collected at the top of the bed.

It will be understood that in so far as this description involves the theory of operation, it is not binding, but merely states my present observation and understanding deduced from observation of the device in successful operation upon intermixed coal and rock, wherein the device effects practically a complete separation of these intermixed materials.

As previously stated, the physical condition of the material is frequently an important element or factor in rapid and complete separation, and accordingly variations may be made in the form and construction of the elements of the mechanism without departing from the principles of the invention.

In Fig. 10, there is shown diagrammatically a duplication of the plate 70 and 84, with certain other attendant parts and in Fig. 11 there is such a duplication of the plates 56, 70 and 84, with certain of their attendant parts. The mechanism in its simpler form, and also in this modified form does away practically entirely with the necessity for exact preliminary sizing of the material, which sizing is laborious, tedious and expensive, requiring also a great investment in expensive machinery. With the present invention, the separation is completely and rapidly and easily carried out through a wide range of sizes of material.

Referring now also to some of the further embodied or illustrated modifications, it will be understood that weights W may be placed upon the floating plates 56, 70 or 84, or any of them, when desired or required, and these weights may be shiftable thereon as found by experiment to be best adapted in connection with the particular materials being operated upon and their physical condition at the time of the separation.

In Fig. 12 the floating plate 56 is shown hinged at its rearward end, having hinges 161 mounted upon a rod 162, extending across and supported by the structure of the separating unit. In Fig. 13 the plate 56 is shown medianly hinged at 163.

In Fig. 14 the plate 56 is shown provided on its under side with transversely disposed baffles 164, 165 and 166, these baffles being longitudinally spaced apart and of successively increased size toward the forward end of the plate. In Figs. 15 and 16 the baffles 167, 168 and 169 are shown adjustable in the plate 56, being longitudinally movable but friction tight in slots formed in the plate.

In Fig. 17, the plate 56 is shown with openings 170 therein and spaced longitudinally therealong. In Figs. 18 and 19 the plate 56 is shown of fluid pressure pervious material 171 mounted in a frame 172, which provides guideways for longitudinally-slidable plates 173, which may be slid along or entirely removed, as may be desired in the direction and regulation of the air pressure.

In Figs. 20 and 21, the baffle 57 is shown vertically adjustable by means of bolt and slot connections 174, with side guide plates 175 mounted on the top of the plate 56.

In Fig. 22, the plate 56 is shown in sections, the respective sections being provided with baffle plates 177, 178 and 179. In Fig. 23 the plate 76 is shown separate from the floating plate 84, and is mounted in stationary position upon the separating unit, and the plate 84 is shown pivoted or hinged at 180.

Fig. 24, the plate 84 is shown provided with a downwardly extending baffle 181, provided with air passages 182 therethrough.

In Fig. 25, the side discharge openings 13 and 14 are shown of variable adjustable size by means of plates 186, having bolt and slot connections 187 with the side walls 10 and 11 of the separating unit. In Fig. 27 the baffles 57, and a baffle plate 188 corresponding to the part 85, and 76, previously described, are independently and adjustably mounted on the machine frame.

In Fig. 28, the parts 84, 85 and 76 are shown in fixed position in connection with the separating unit, as with certain materials and for certain purposes the highest degree of flexibility and adjustment is not essential for this end of the unit.

In Figs. 29 and 30 the entire sides 10 and 11 of the units are shown vertically adjustable by means of bolt and slot connections 190.

It will be understood that departures may be made from the exact structures shown and described herein, within the scope of the accompanying claims, without departing from the principles of the invention and without sacrificing its chief advantages.

What I claim is:—

1. A mechanism for separating intermixed divided materials of different specific gravities, including in combination a bed bottom having sides for maintaining therebetween a bed of materials of substantial depth, means for separating the materials in the bed and for discharging a heavier material from the bottom of the bed, and means for discharging a lighter material from the upper part of the bed along the side edge thereof by the use of a laterally flowing current of air.

2. A mechanism for separating intermixed divided materials, comprising a long narrow trough with an air pervious bottom, means for passing air upwardly through the air pervious bottom, means for vibrating the trough, whereby the materials progress along the trough, in the same general direction and are stratified, means for delivering the materials forming the heavier and lower stratum at the lower part of the front end of the table, and means for discharging the lighter materials forming the upper stratum laterally by the use of laterally flowing air currents.

3. A mechanism for separating intermixed divided materials of different specific gravities, including in combination means for maintaining a relatively long and narrow bed of the materials, a horizontally extending element on the top of the bed of materials for confining them, means for separating the materials in the bed and for progressing a lighter material upwardly and transversely and a heavier material downwardly and forwardly along the bed.

4. A mechanism for separating intermixed divided materials of different specific gravities, including in combination means for maintaining a relatively long and narrow bed of the materials, means for laterally and vertically confining the bed of materials, means for separating the materials in the bed and for progressing a lighter material upwardly and transversely to discharge the separated lighter material from the bed and a heavier material downwardly and forwardly along the bed.

5. A mechanism for separating intermixed divided materials of different specific gravities, including in combination means for maintaining a relatively long and narrow bed of the materials, and means for separating the intermixed materials, said means comprising devices for forcing air upwardly through the bed and then transversely out from the top of the bed to force the lighter material to the top of the bed and to discharge it from the top of the bed and for moving the heavy material longitudinally along the bed and discharging it at one end.

6. A mechanism for separating intermixed divided materials of different specific gravities, including in combination means for maintaining a bed of the materials, means for stratifying the intermixed materials and discharging the lower stratum at the end of the bed and the upper stratum over the side of the bed, said means comprising devices for forcing air upwardly through the bed and for then directing it transversely out from the top of the bed whereby the materials are stratified and the lighter material discharged from the top of the bed, and means automatically supplying the intermixed materials to the bed at the same rate as the separation is effected.

7. A mechanism for separating intermixed divided materials of different specific gravities, including in combination means for vertically confining a bed of the materials, means for separating the intermixed materials and discharging the separated materials from the bed, said means comprising devices for forcing air upwardly through the bed and transversely out from the top of the bed to force the lighter material to the top of the bed and to discharge it from the top of the bed, and means for creating a backward counter current from the front of the bed to insure the final and complete separation of the intermixed materials.

8. A mechanism for separating intermixed divided materials of different specific gravities, including in combination means for maintaining a relatively long and narrow bed of the materials, horizontally extending elements for confining the bed of materials between them, means for separating the intermixed materials and discharging the separated materials from the bed, said means comprising devices for forcing air upwardly through the bed and transversely out from the top of the bed to force the lighter material to the top of the bed and to discharge it from the top of the bed, and means acting on the separated lighter material at the top of the bed to arrest its travel along the bed and to assist in the discharge of the separated light material.

9. A mechanism for separating intermixed divided materials of different specific gravities, including in combination means for maintaining a bed of the materials, means for separating the intermixed materials and discharging the separated materials from the bed, said means comprising devices for forcing air upwardly through the bed and transversely out from the top of the bed to force the lighter materials to the top of the bed and to discharge it from the top of the bed, means acting on the separated lighter material at the top of the bed to arrest its travel along the bed and to assist in the discharge of the separated light material, means for creating a backward counter current from the front of the bed to insure the final and complete separation of the intermixed materials, and auxiliary discharge means located between said arresting means and said counter current means for discharging said finally separated part of the lighter material.

10. A mechanism for separating intermixed divided materials of different specific gravities, including in combination means for maintaining a relatively long and narrow bed of the materials, means for separating the intermixed materials and discharging the separated materials from the bed, said means comprising devices for forcing air upwardly through the bed and transversely out from the top of the bed to force the lighter material to the top of the bed and to discharge it from the top of the bed, means acting on the separated lighter material at the top of the bed to arrest its travel along the bed and to assist in the discharge of the separated light material, means for creating a backward counter current from the front of the bed to insure the final and complete separation of the intermixed materials, and auxiliary discharge means located between said arresting means and said counter current means for discharging said finally separated part of the lighter material.

11. A mechanism for separating intermixed divided materials of different specific gravities, including in combination a relatively long and narrow body for receiving the mixed materials at the rear end, and having upwardly extending sides and a fluid pervious bottom, and a floating top closure resisting and also yielding to the air pressure, and means for forcing air under pressure in through the bottom and out transversely from beneath the floating top closure.

12. A mechanism for separating intermixed divided materials of different specific gravities, including in combination a relatively long and narrow body for receiving the mixed materials at the rear end, and having upwardly extending sides and a fluid pervious bottom, and a floating top closure resisting and also yielding to the air pressure, means for forcing air under pressure in through the bottom and out transversely from beneath the floating top closure, and means for creating a back air pressure from the front end of the body.

13. A mechanism for separating intermixed divided materials of different specific gravities, including in combination a relatively long and narrow body for receiving the mixed materials at the rear end, and having upwardly extending sides and a fluid pervious bottom, and a floating top closure resisting and also yielding to the air pressure, means for forcing air under pressure in through the bottom and out transversely from beneath the floating top closure, and a baffle arresting the separated lighter material at the forward end of the floating top closure.

14. A mechanism for separating intermixed divided materials of different specific gravities, including in combination a relatively long and narrow body for receiving the mixed materials at the rear end, and having upwardly extending sides and a fluid pervious bottom, and a floating top closure resisting and also yielding to the air pressure, means for forcing air under pressure in through the bottom and out transversely from beneath the floating top closure, means for creating a back air pressure from the front end of the body, and an auxiliary floating top closure between the first-mentioned top closure and said back pressure creating means.

15. A mechanism for separating intermixed divided materials of different specific gravities, including in combination a relatively long and narrow forwardly and downwardly inclined body receiving the mixed materials at the rear end, and having upwardly extending sides having discharge openings along the upper edge and a fluid pervious bottom, and a floating top closure resisting and also yielding to the air pressure, and means for forcing air under pressure in through the bottom and out transversely from beneath the floating top closure through said openings.

16. A mechanism for separating intermixed divided materials of different specific gravities, including in combination a relatively long and narrow forwardly and downwardly inclined body receiving the mixed materials at the rear end, and having upwardly extending sides and a fluid pervious bottom, and a floating top closure resisting and also yielding to the air pressure, means for forcing air under pressure in through the bottom and out transversely from beneath the floating top closure, and means for creating a back air pressure from the front end of the body.

17. A mechanism for separating intermixed divided materials of different specific gravities, including in combination a relatively long and narrow forwardly and downwardly inclined body, receiving the mixed materials at the rear end, and having upwardly extending sides and a fluid pervious bottom, and a floating top closure resisting and also yielding to the air pressure, means for forcing air under pressure in through the bottom and out transversely from beneath the floating top closure, means for creating a back air pressure from the front end of the body, and an auxiliary floating top closure between the first-mentioned top closure and said back pressure creating means.

18. The process of separating intermixed divided materials which comprises vertically confining a bed of the material and subjecting it to a flow of air under pressure from beneath to separate and stratify the materials and then directing the air current laterally to discharge the lighter and superior separated material from the bed, and subjecting the forward part of said superior and lighter material to a backwardly moving current of air to insure complete separation and discharge of the lighter material.

19. The process of separating intermixed divided materials which comprises vertically confining a bed of the material and subjecting it to a flow of air under pressure from beneath to separate and stratify the materials and then directing the air current laterally to discharge the lighter and superior separated material from the bed, and arresting the movement of the lighter material to facilitate the discharging action of the air current thereon, and subjecting the forward part of said superior and lighter material to a backwardly moving current of air to insure complete separation and discharge of the lighter material.

20. The process of separating intermixed divided materials which comprises vertically confining the intermixed materials in a relatively long and narrow bed and forcing air under pressure up through the bottom of the bed to separate and stratify the materials and subsequently directing the air outwardly transversely from the upper part of the bed to discharge the lighter and superior separated material, and subjecting the forward part of said superior and lighter material to a backwardly moving current of air to insure complete separation and discharge of the lighter material.

21. The process of separating intermixed divided materials which comprises vertically confining the intermixed materials in a relatively long and narrow bed, forcing air under pressure up through the bottom of the bed to separate and stratify the materials and subsequently directing the air outwardly transversely from the upper part of the bed to discharge the lighter and superior separated material, and mechanically arresting the movement of the lighter material longitudinally of the bed to facilitate the discharging action of the air current thereon, and subjecting the forward part of said superior and lighter material to a backwardly moving current of air to insure complete separation and discharge of the lighter material.

22. A mechanism for separating intermixed divided materials of different specific gravities, including in combination means for stratifying the bed of materials, including devices for passing lifting air currents through the bed, means for progressing a heavy material along the bottom of the bed and means including a horizontally disposed air deflecting plate, for progressing a lighter material laterally from the top of the bed to a point of discharge.

23. A mechanism for separating intermixed divided materials of different specific gravities, comprising an air pervious table having sides for laterally confining the materials and forming a bed of substantial depth, means for passing air upwardly through the bed, means for vibrating the bed whereby the material are stratified progressively, and both strata are moved along the bed horizontally in the same general direction, and an air deflecting plate immediately above the bed for deflecting the upwardly flowing air laterally, whereby the upper stratum is impelled laterally by such deflected air.

24. A mechanism for separating intermixed divided materials of different specific gravities, comprising an air pervious table having sides for confining the materials therebetween for forming a bed of substantial depth, means for vibrating the bed, means for passing air upwardly through the bed, whereby the materials move along in the same general horizontal direction and are stratified progressively, means for discharging the separated heavy material at one end of the bed, and means for discharging the separated lighter material by causing it to spill over one side of the bed, including devices for deflecting said lighter materal laterally and preventing its forward escape.

25. The process of separating intermixed divided materials, comprising subjecting a bed of materials of substantial depth to the action of vibration and of air flowing upwardly therethrough, whereby the materials move along the bed in the same general horizontal direction and progressively stratify, discharging the heavy material in the lower stratum at one end of the bed and deflecting the upwardly flowing air laterally as it leaves the upper stratum whereby it impels the material in the upper stratum laterally, to a discharge at one side of the bed.

26. The process of separating intermixed divided materials of different specific gravities, comprising confining the sides of the materials to form a bed of substantial thickness, subjecting the bed to upwardly flowing air and vibration, whereby the bed moves slowly along, the heavy materials gradually settling into a lower stratum, while the lighter materials gradually rise into an upper stratum, both strata moving along in the same general direction and discharging the lighter separated materials over the sides of the bed, by laterally deflecting said lighter material and preventing its forward escape, and discharging the heavier separated materials at the end of the bed.

27. The process of separating intermixed divided materials of different specific gravities, comprising maintaining a bed of materials of substantial thickness, subjecting the bed of materials to the action of an upward air blast and vibration, whereby the light and heavy materials are moved along in the same general direction and are stratified progressively, discharging the heavier material from the lower stratum and discharging the lighter material from the upper stratum by spilling it over the upper edge of the bed, including blocking said lighter material to prevent its forward escape and to cause it to flow laterally.

28. A mechanism for separating intermixed divided materials including in combination an air-pervious table, means for maintaining thereon a bed of materials, means for stratifying the materials in substantially horizontal superposed strata according to their specific gravities and for progressing the different strata to places of discharge including an air chamber beneath the table for forcing continuous lifting air currents upwardly through substantially all parts of the bed and devices for reciprocating the table, and means for automatically maintaining the air in said air chamber at a predetermined substantially constant pressure.

29. A mechanism for separating intermixed divided materials including in combination an air-pervious table, means for maintaining thereon a bed of materials, means for stratifying the materials in substantially horizontal superposed strata according to their specific gravities and for progressing the different strata to places of discharge including an air chamber beneath the table for forcing lifting air currents upwardly through the bed and devices for reciprocating the table, means for forcing air under pressure into said air chamber, a hood above the table, means for drawing air and dust from said hood to a dust-collecting device, and a valve connected with the air chamber for maintaining the pressure of the air supplied to the table below a predetermined amount.

30. A mechanism for separating intermixed divided materials including in combination an air-pervious table, means for maintaining thereon a bed of materials, means for stratifying the materials in substantially horizontal superposed strata according to their specific gravities, means for progressing one stratum substantially directly forwardly along the table to discharge at the front end thereof, means for impelling another stratum of different specific gravity as soon as it stratifies to discharge substantially immediately at the side edge of the table, and means for regulating the discharge of said laterally-discharging material by air currents and yielding mechanical pressure.

31. A mechanism for separating intermixed divided materials including in combination an air-pervious table, means for maintaining thereon a bed of materials, means for stratifying the materials in substantially horizontal superposed strata according to their specific gravities, means for impelling one stratum laterally as soon as it stratifies, means for fractionally discharging said stratum including a plurality of discharge openings along the side edge of the table, and means including air currents for controlling the discharge of said materials through said openings.

32. A mechanism for separating intermixed divided materials including in combination a relatively long and narrow smooth-bottomed trough having side walls of substantial height, means for feeding intermixed materials to one end thereof, means for partially separating the materials including devices for vibrating the trough, means for discharging a heavier settled material at one end of the trough, and means for discharging lighter material at the side of the trough including devices for directing a sheet of air under pressure laterally across the trough to impel the lighter material laterally.

In testimony whereof, I have signed my name to this specification.

KENNETH DAVIS.